United States Patent [19]

Bresson

[11]  4,250,067
[45]  Feb. 10, 1981

[54] COPOLYMER-OIL BLENDS STABILIZED WITH ASPHALT

[75] Inventor: Clarence R. Bresson, Bartlesville, Okla.

[73] Assignee: Phillips Petroleum Company, Bartlesville, Okla.

[21] Appl. No.: 928,037

[22] Filed: Jul. 25, 1978

[51] Int. Cl.³ .............................................. C08L 91/00
[52] U.S. Cl. ...................... 260/28.5 AS; 260/28.5 A; 260/28.5 B
[58] Field of Search ................... 260/28.5 A, 28.5 B, 260/28.5 AS

[56] References Cited

U.S. PATENT DOCUMENTS

| | | | |
|---|---|---|---|
| 3,115,533 | 12/1963 | Wiseblood | 260/28.5 B X |
| 3,194,780 | 7/1965 | Wald | 260/28.5 B X |
| 3,449,250 | 6/1969 | Fields | 252/51.5 |
| 3,676,387 | 7/1972 | Lindlof | 260/28.5 B |
| 3,716,510 | 2/1973 | Belak | 260/28.5 AS |
| 3,827,999 | 8/1974 | Crossland | 260/33.6 AQ |
| 3,833,528 | 9/1974 | Behlinger et al. | 260/28.5 AS |
| 3,853,798 | 12/1974 | Oelsner et al. | 260/28.5 B X |
| 3,853,799 | 12/1974 | Behling et al. | 260/28.5 AS |
| 3,945,977 | 3/1976 | Snonely | 260/33.6 AQ |
| 3,978,014 | 8/1976 | van Beem et al. | 260/28.5 AS |
| 4,115,335 | 9/1978 | Reusser et al. | 260/28.5 AS |

*Primary Examiner*—Melvyn I. Marquis

[57] ABSTRACT

A method for hot melt blending a stablized composition of rubbery polymer and extender oil by dissolving asphalt in the extender oil prior to dissolving rubbery copolymer in the mixture. Preferably up to about 10 weight percent asphalt is dissolved in the extender oil prior to addition of the rubbery polymer with provision for later addition of asphalt to the mixture up to about 80 weight percent of the total composition. The usual fillers and additives are compatible with the stablized composition.

9 Claims, No Drawings

COPOLYMER-OIL BLENDS STABILIZED WITH ASPHALT

BACKGROUND OF THE INVENTION

The invention relates to compositions of rubbery polymer and extender oil. In one of its aspects the invention relates to the stabilization of such compositions against oxidative degradation. In another aspect of the invention stabilized compositions of rubbery polymer, extender oil, and asphalt are provided.

For several years rubberized asphaltic compositions have been used to produce membranes, mastics and sealants, which require special performance properties including water-resistance, flexibility, crack-resistance, adhesion and outdoor stability. The make-up of these compositions is generally 25-95 wt. percent asphalt and 5-25 wt. percent rubber with varying amounts of fillers, stabilizers, extender oils, etc. Because of the multiplicity of components, many users of such asphaltic products preblend some of the ingredients which are otherwise difficult or time consuming to incorporate. One such blend is an extender oil and the rubber which can be prepared by dissolving the rubber in hot extender oil. To this blend is added asphalt and other desired ingredients. It has long been suspected, although not confirmed, that rubbers of a certain type (e.g. conjugated diene/monovinyl aromatic copolymers) degrade when pre-dissolved in certain extender oils (e.g., paraffinic, naphthenic, aromatic) thereby altering properties of the resulting rubberized asphalt-based products. The use of stabilizers has generally been limited because of cost and the effective concentration required. The search for effective low cost stabilizers has continued. This invention embodies such a stabilization system. It is, therefore, an object of this invention to provide a method for stabilizing blends of oil and rubbery polymer against oxidative degradation. It is another object of this invention to provide stabilized compositions of rubbery copolymer, oil, and asphalt.

Other aspects, objects and the various advantages of this invention will become apparent upon reading this specification and the appended claims.

STATEMENT OF THE INVENTION

According to this invention a method is provided for hot melt blending of stabilized composition of rubbery polymer and extender oil by first dissolving in the extender oil a stabilizing amount of asphalt thereby producing a first blend in which is then dissolved the rubbery copolymer. In this manner, conjugated diene/monovinyl aromatic copolymer-oil blends used in asphaltic compositions are stabilized against oxidative degradation of the copolymer during hot melt blending by pre-dissolving asphalt in the oil prior to the hot dissolution of the copolymer.

One embodiment of this invention provides a composition containing a rubbery polymer, extender oil, and a small amount of asphalt. Preferably the rubbery copolymer is a conjugated diene/monovinyl aromatic copolymer and the amount of asphalt is sufficient to provide a composition that is relatively stable to copolymer oxidative degradation.

In another embodiment the invention provides a method by which the time required to dissolve rubbery copolymer in extender oil is reduced by the addition of up to about 10 wt. % of the total composition of asphalt in the extender oil before the rubbery copolymer is added.

Conjugated diene/monovinyl aromatic copolymer-oil blends used in asphaltic compositions are stabilized against oxidative degradation of the copolymer during hot melt blending by pre-dissolving a portion of the asphalt in the oil prior to the hot dissolution of the copolymer. One embodiment of this invention provides a composition containing a conjugated diene/monovinyl aromatic copolymer, extender oil, and a small amount of asphalt that is relatively stable to copolymer oxidative degradation. Another embodiment provides a method whereby the time required to dissolve the copolymer in the oil is reduced.

The polymers useful in this invention are any of those considered to be rubbery and thermoplastic particularly those that are subject to thermal or oxidative degradation. Broadly this includes those polymers based on $C_2$ to $C_6$ alkenes such as propylene, butene and isobutylene and conjugated $C_4$ to $C_8$ dienes such as butadiene and isoprene. Homopolymers such as polybutene, polyisobutylene (butyl rubber), polyisoprene, and polybutadiene can be used as well as copolymers employing conjugated dienes (i.e., butadiene and isoprene), monovinyl aromatics (i.e., styrene), acrylonitrile, unsaturated esters and the like. The preferred polymers useful in this invention are those based on 50-95 parts by weight conjugated diene/50-5 parts by weight monovinyl aromatics, these polymers can be linear or branched (radial) in structure and have block or random monomer distribution. Although not limited in molecular weight, the weight average molecular weight of useful polymers is generally considered to be between 50,000 to 500,000, preferably 125,000 to 350,000. The polymers can be hydrogenated although those having 1 to 50 weight percent unsaturation are preferred. Unsaturated polymers are more susceptible to oxidative and thermal degradation and thus considered to be more within the concept of this invention. The preparation of the copolymers employed in this invention are described in U.S. Pat. Nos. 3,281,383 and 3,639,521. The pyhsical characteristics of copolymers used in this invention including the controls are as follows:

| Polymer | Polymer Type | Diene/Styrene[a] Wt. Ratio | Coupling Agent | weight Averge Mol. Wt. $M_w$ |
|---|---|---|---|---|
| A | Radial Teleblock | 60/40 | $SiCl_4$ | 150,000 |
| B | Radial Teleblock | 85/15[b] | $SiCl_4$ | 275,000 |
| C | Radial Teleblock | 70/30[c] | $SiCl_4$ | 300,000 |
| D | Radial Teleblock | 70/30[d] | Epoxol[e] | 95,000 |
| E | Linear Block | 70/30 | — | 120,000 |
| F | Linear Block | 85/15[b] | — | 154,000 |

[a] Diene is butadiene except where noted
[b] Diene is isoprene
[c] Contains 33 wt. % (50 phr) oil
[d] Hydrogenated
[e] An epoxidized soybean or linseed oil These polymers can be employed in a finite amount in the range of up to 50 wt. percent dissolved in a blend of asphalt, polymer and extender oil, but the range of about 5 to about 25 wt. percent is generally preferred.

The asphalts which can be employed in this invention include conventional petroleum asphalts, natural asphalts, Gilsonite, air-blown and non-blown asphalts, coal tar pitch, petroleum derived hydrocarbon resins, liquid coal tar and other such similar materials. Asphalts of a certain penetration grade are not required. Any type asphalt can be used. It is currently preferred, however, to use non-blown asphalts. It is also preferred, but not required, that the asphalt used to impart thermal and oxidative stability in a rubber-extender oil blend be the same asphalt that is used in the final asphalt-based product. Mixtures of different type asphalts can be used and these mixtures can contain additional ingredients such as aromatic oils or aromatic thermoplastic resins. When the asphalt is used as a stabilizer as herein described, it can be employed in a finite amount in the range up to 80 wt. percent of the rubber-extender oil-asphalt blend although it is preferred to use the asphalt in the range of about 5 to about 25 wt. percent. About 5 to about 15 wt. percent of the asphalt must be dissolved in the extender oil prior to the dissolution of the rubber to obtain the stabilizing benefits set forth in this invention.

The extender oils useful in this invention can be aromatic, paraffinic or naphthenic in character. Although the copolymers described herein are not subject to significant degradation in aromatic oils, the aromatic oils can be employed as extender oils in this invention to impart thermal and oxidative stability. Our pollution problems, however, cause aromatic oils to be less favored as extender oils, than either naphthenic or paraffinic oils. Of the naphthenic or paraffinic oils, those with low viscosities (<5,000 cps/148.9° C.) tend to give shorter rubber dissolution times and lower rubber-oil blend viscosities.

The premixing of asphalt with extender oil and subsequent addition of rubbery polymer can be conducted in any desired manner so long as the final blend is a homogenous dispersion. A simple paddle type stirrer can be used for more fluid blends. If an aggregate, filler, or additional asphalt is to be added to the asphalt-oil-polymer blend, such that a thick mastic or paste-like product results, then a heavy duty mixer such as a Day mixer or Baker-Perkins mixer equipped with sigmoid or dispersion blades can be used.

The current invention is particularly useful in the preparation of products such as rubberized asphaltic concrete, mastics, sealants, pipeline coatings, roofings, insulation materials, specialty rubber, and other similar type applications. For this reason, the selection of particular type fillers, aggregates, pigments, processing aids, modifying resins (tackifiers), adhesion promoters and the like is left to those skilled in the art.

The following examples illustrate the operability of this invention.

EXAMPLE I

This is a typical procedure of determining the time required to dissolve a rubbery copolymer in an extender oil. Into a 600 milliliter stainless steel beaker fitted with a heating mantle, thermometer and paddle stirrer was introduced 240 grams of Flexon 766, an extender oil. The oil was heated to 204° C. with stirring whereupon 60 grams of a ground-up rubber copolymer, Polymer A (60/40 weight ratio of butadiene/styrene), was added with continued stirring while maintaining the temperature at 204° C. The heating and stirring was continued until upon spreading a thin film across a paper towel with a spatula no visible lumps were seen. The time required to reach this point was recorded as the dissolution time. The test was repeated predissolving 34 grams (10 wt. %) asphalt (penetration grade 85–100) in 240 grams of extender oil (70 wt. %) before the addition of 618 grams rubbery copolymer (20 wt. %). Tables II and III give dissolution times obtained with various copolymers dissolved in various extender oils.

TABLE 1

| Oil Type | Oil Properties | | | | | | |
|---|---|---|---|---|---|---|---|
| | Naphthenic | | | Paraffinic | | Aromatic | |
| Trade Name | Flexon[a] | Tufflo[b] | Shellflex[c] | Sunpar[d] | Boron[e] | Philrich[f] | Unit 30[f] |
| | 766 | 6204 | 371 | 2280 | CD103 | 5 | EO |
| Viscosity, cps, at 37.8° C. | 90.4 | 318 | 77.5 | 500 | 124 | 2330 | 11.5 |
| Refractive Index, $n^{20}D$ | 1.4885 | 1.4945 | 1.4908 | 1.4908 | — | 1.5683 | 1.5844 |
| Viscosity Gravity Constant | 0.830 | 0.840 | 0.839 | 0.796 | — | 0.928 | 0.988 |
| Molecular Weight | — | 490 | — | 720 | — | 450 | 227 |
| Carbon Type Analysis | | | | | | | |
| Aromatic Carbon, % | 1 | 2 | 3 | 4 | — | 43.0 | 54.2 |
| Naphthenic Carbon, % | 43 | 49 | 44 | 23 | — | 10.0 | 20.0 |
| Paraffinic Carbon, % | 56 | 49 | 53 | 73 | — | 47.0 | 25.8 |

[a]Humble Oil and Refining Co.
[b]Atlantic Richfield Co.
[c]Shell Oil Co.
[d]Sun Oil Co.
[e]Boron Oil Co.
[f]Phillips Petroleum Co.

TABLE II

Dissolution Time of Butadiene/Styrene-Based Copolymers in Various Type Extender Oils

| | | Dissolution Time, mins at 204° C. | |
|---|---|---|---|
| Oil Type | Trade Name | Saturated Copolymer[a] | Unsaturated Copolymer[b] |
| Naphthenic | Flexon 766 | 90 | 85 |
| Naphthenic | Tufflo 6204 | — | 90 |
| Paraffinic | Sunpar 2280 | 100 | 100 |
| Aromatic | Philrich 5 | 140 | 120 |
| Aromatic | Unit 30 EO | — | 45 |

[a]Polymer D 70/30 wt. ratio of hydrogenated butadiene/styrene radial teleblock $M_w$ 95,000, <30% original vinyl unsaturation
[b]Polymer C, 70/30 Wt. ratio butadiene/styrene radial teleblock, $M_w$ 300,000 contains 50 phr naphthenic oil.

The above data show that that unsaturated butadiene/styrene copolymers dissolve slightly faster than saturated butadiene/styrene copolymers and that the naphthenic oils generally tend to have better dissolving powers than paraffinic or aromatic oils (Unit 30 EO being an exception).

TABLE III

Dissolution Time of Conjugated Diene/monovinyl Aromatic Copolymers in a Naphthenic Oil in the Presence of Asphalt

| 20 Wt. Percent Rubber/Naphthenic Oil[a] | Dissolution Time, mins. at 204° C. | |
|---|---|---|
| Rubber: | No Asphalt | 10 Wt. % Asphalt[b] |
| 1. 60/40 Wt. Ratio Butadiene/styrene, $M_w$ 150,000[c] | 120 | 90 |
| 2. 70/30 Wt. Ratio Butadiene/styrene, $M_w$ 300,000[d] contains 50 phr naphthenic oil | 85 | 90 |
| 3. 85/15 Wt. Ratio Isoprene/styrene, $M_w$ 275,000[e] | 90 | 90 |

[a]Flexon 766
[b]Kansas City Asphalt, 85–100 penetration grade
[c]Polymer A
[d]Polymer C
[e]Polymer B

EXAMPLE II

Oil rubber blends prepared as described in Example I were heated until all the ingredients were dissolved. The blends were cooled to ambient room temperature and the degree of copolymer degradation determined by Gel Permeation chromatography (GPC) analysis using a Waters GPC analyzer, Model 200, equipped with four 4 ft. columns connected in series containing Styragel ® packing (Styragel is a crosslinked polystyrene from Waters, Inc.); porosity $10^6$ angstroms in the first column to $10^3$ angstroms in the fourth column. The flow rate was one milliliter/min. of tetrahydrofuran solvent and the column operated at ambient room temperature.

The data in Table IV below show that copolymers dissolved in aromatic or paraffinic oils exhibit little if any degradation at 204° C. but when dissolved in naphthenic oils, degradation occurs rapidly. The data also show that hydrogenated copolymers (i.e. Polymer D) are stable in naphthenic oil but unsaturated copolymers regardless of structure (linear or radial) degrade in naphthenic extender oils. Examples of the unsaturated copolymers are the radial teleblock copolymers, Polymer C and Polymer A, and the linear block copolymers, Polymer E and Polymer F. Polymer degradation was measured by determining the difference in peak elution count points before and after heating in a particular extender oil.

TABLE IV

| | Approximate GPC Count Point, mins | | | | |
|---|---|---|---|---|---|
| Extender Oil | Polymer A | Polymer C | Polymer D | Polymer E | Polymer F |
| 1. Control - No oil -Naphthenic Oil | 25.4 | 23.6 | 25.5 | 24.7 | 24.4 |
| 2. Flexon 766 | 28.5 | 27.8 | 25.5 | 26.8 | 25.8 |
| 3. Flexon 766 with $N_2$ | — | 23.5 | — | — | — |
| 4. Shell Flex 371 -Paraffinic Oil | — | 27.3 | — | — | — |
| 5. Sunpar 2280 -Aromatic Oil | — | 23.7 | — | — | — |
| 6. Philrich 5 | — | 23.8 | 25.5 | — | — |
| 7. Unit 30 EO | 25.5 | 23.7 | — | — | — |
| 8. Boron CD103 | — | 23.6 | — | — | — |

The data in Table V below show that when 10 wt. percent asphalt is added to a naphthenic oil, the copolymer which is subsequently dissolved in the asphalt-oil mixture exhibits much less degradation and in one case (Polymer A) almost none. The data also indicate that as the conjugated diene portion of the copolymer increases in concentration, there appears to be a corresponding increase in the percent change in GPC Peak Count Point when the asphalt is present. This increase is probably due to the increase in unsaturation which indicates the need for thermal or oxidative stabilization.

TABLE V

| | Aprox. Peak Count Point | % Increase in GPC Peak Count Point |
|---|---|---|
| 1. 60 pts. Bd/40 pts. S[a] | 25.41 | — |
| 2. 60 pts. Bd/40 pts S(20 wt. %) + Naphthenic Oil[b] (80 Wt. %) | 28.55 | 12.4 |
| 3. 60 pts. Bd/40 pts. S(20 wt. %) + Naphthenic Oil[b] (70 wt. %) + Asphalt[c] (10 wt. %) | 25.62 | 0.8 |
| 4. 70 pts. Bd/30 pts. S[d] | 23.74 | — |
| 5. 70 pts. Bd/30 pts. S(20 wt. %) + Naphthenic Oil[b] (80 wt. %) | 28.14 | 17.8 |
| 6. 70 pts. Bd/30 pts. S(20 wt. %) + Naphthenic Oil[b] (70 wt. %) + Asphalt[c] (10 wt. %) | 24.21 | 2.0 |
| 7. 85 pts. Iso/15 pts. S[e] | 24.00 | — |
| 8. 85 pts. Iso/15 pts. S(20 wt. %) + Naphthenic Oil[b] (80 wt. %) | 25.38 | 5.8 |
| 9. 85 pts. Iso/15 pts. S(20 wt. %) + Naphthenic Oil[b] (70 wt. %) + Asphalt[c], (10 wt. %) | 24.63 | 2.6 |

[a]Polymer A
[b]Flexon 766
[c]85–100 penetration grade
[d]Polymer C
[e]Polymer B, Iso = isoprene

EXAMPLE III

Rubber degradation was also measured by a change in viscosity. Rubber-extender oil blends were prepared as described in Example I. Various commercial stabilizers were evaluated by predissolving the stabilizers in the extender oil before dissolution of the rubber. A comparison of the stabilizers and the current invention using asphalt as a stabilizer is shown in Table VI. The viscosity value of the oil-rubber blend with added asphalt is better than any of the blends with added commercial stabilizers indicating better stabilization of the blend with asphalt added. The low value of 544 cps for the asphalt containing oil-polymer blend compared to the control, 2055 cps appears to suggest polymer degradation. However, the blend contains 10 wt. percent asphalt which is a very low viscosity liquid at the temperature at which the oil-rubber blend viscosities were measured (148.9° C.) and accounts for the low viscosity of the oil-rubber-asphalt blend.

TABLE VI

Effect of Stabilizers on Polymer Stability During Dissolution

| | Stabilizer % of Rubber Content[a] | Viscosity, cps, 148.9° C. |
|---|---|---|
| 1. | Control - solvent cast[b] | 2,055 |
| 2. | Nitrogen atmosphere | 1,265 |
| 3. | 10 wt. % Asphalt[c] | 544 |
| 4. | 2.5 wt. % Epoxy Soya Oil[d] | 150 |
| 5. | 1.0 wt. % Tri(nonylated phenyl) phosphite[e] | 244 |
| 6. | 1.33 wt. % Alkylated Arylated Bisphenolic Phosphite[f] + 0.66 wt. % [Octadecyl 3-(3,5-t-butyl, 4-hydroxyphenyl) propionate][g] | 166 |

[a] 20 wt. % 70 pts. Bd/30 pts. S Copolymer (Polymer C) dissolved in 80 wt. % naphthenic extender oil (Flexon 766)
[b] Prepared by dissolving the rubber and extender oil in cyclohexane and evaporating cyclohexane at room temperature, thereby, eliminating any thermal treatment for possible polymer degradation
[c] 85-100 Penetration
[d] Hatcol 16[R], W. R. Grace
[e] Polygard HR[R], Uniroyal Chemicals
[f] Agerite Geltrol[R], R. T. Vanderbilt
[g] Irganox[R] 1076, Ciba-Geigy The foregoing data show that when an unsaturated rubber is predissolved in a hot naphthenic oil for subsequent compounding with additional ingredients, the rubber exhibits degradation, either by heat or oxidation or both. This degradation can be greatly reduced by pre-dissolving asphalt in the naphthenic oil before the rubber is dissolved. Although a large amount of asphalt is employed for stabilization (1 to 10 wt. percent) compared to the usual amounts of commercial stabilizers used (0.2 to 2 wt. %), the asphalt is effective and not only more economical; but, more importantly, is generally one of the major ingredients that is subsequently added to the oil-rubber blend to produce the desired asphaltic-based product.

I claim:

1. A method for hot melt blending a stabilized composition of rubbery polymer and extender oil said method comprising:
    (a) dissolving a stabilizing amount of of asphalt in said extender oil to produce a first blend, said stabilizing amount in the range of about 5 to about 15 percent by weight of the total composition, and then
    (b) dissolving rubbery polymer in said first blend.

2. A method of claim 1 wherein said rubbery copolymer is dissolved in said first blend in an amount up to about 50 weight percent of the total mixture.

3. A method of claim 1 wherein after dissolution of rubbery polymer in the first blend additional asphalt is dissolved in the composition to provide a total of up to about 80 weight percent asphalt in the composition.

4. A method of claim 2 wherein the amount of rubbery polymer in the composition is in the range of about 5 to about 25 weight percent of the total mixture.

5. A method of claim 3 wherein the amount of asphalt in the composition is in the range of about 5 to about 25 weight percent of the total mixutre.

6. A method of claim 1 wherein the rubbery polymers are chosen from the group consisting of (1) polymers of alkenes having from about 2 to about 6 carbon atoms and (2) polymers of conjugated dienes having from about 4 to about 8 carbon atoms.

7. A method of claim 6 wherein the rubbery polymers are chosen from among those having from about 50 to about 95 parts by weight conjugated diene and about 50 to about 5 parts by weight monovinyl aromatics with either linear or branched configuration and having block or random monomer distribution.

8. A method of claim 1 wherein the compositions further contain additives chosen from among fillers, aggregates, pigments, processing aids, modifying resins, and adhesion promoters.

9. A method of claim 1 wherein the time required for dissolving the rubbery polymer in the extender oil is reduced as compared to a method wherein no asphalt is dissolved in extender oil to provide a first blend.

* * * * *